Figure 1:
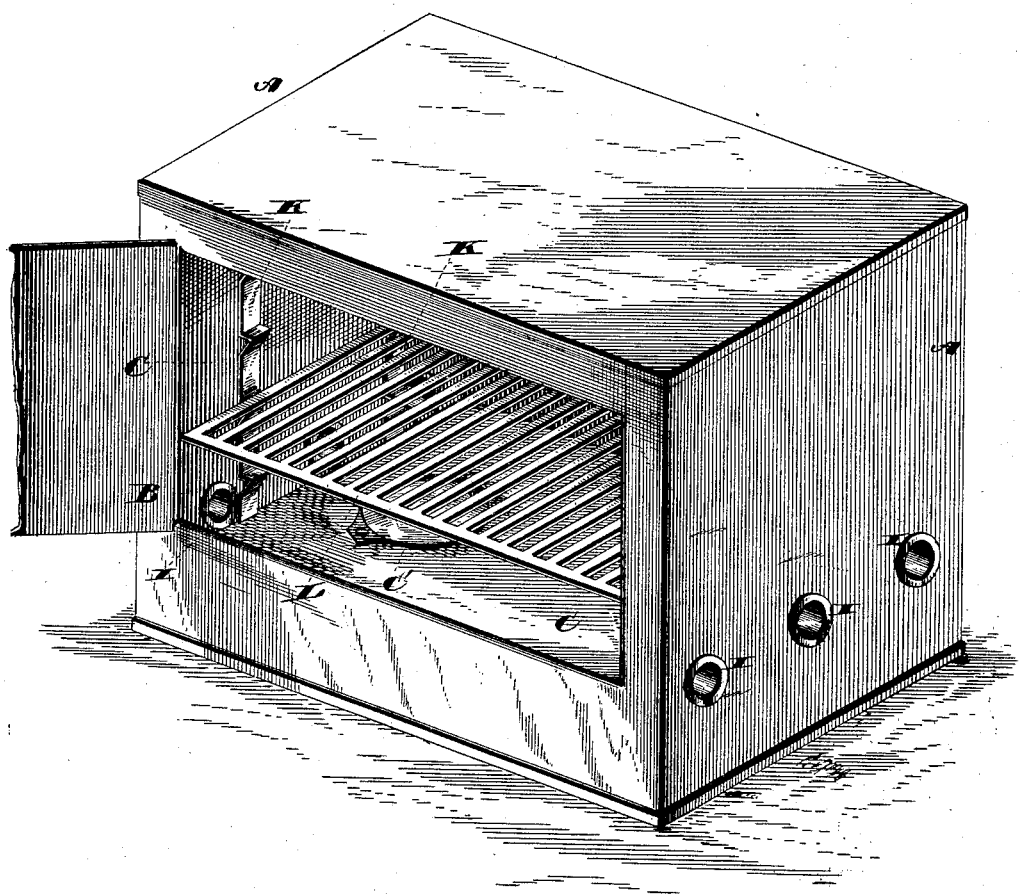

(No Model.) 2 Sheets—Sheet 1.

M. C. ROOT.
PORTABLE OVEN.

No. 371,151. Patented Oct. 4, 1887.

Witnesses:
Chas. J. Williamson
Henry C. Hazard

Inventor:
M. C. Root by
Crindle & Russell his Attys (No Model.) 2 Sheets—Sheet 2.
M. C. ROOT.
PORTABLE OVEN.
No. 371,151. Patented Oct. 4, 1887.
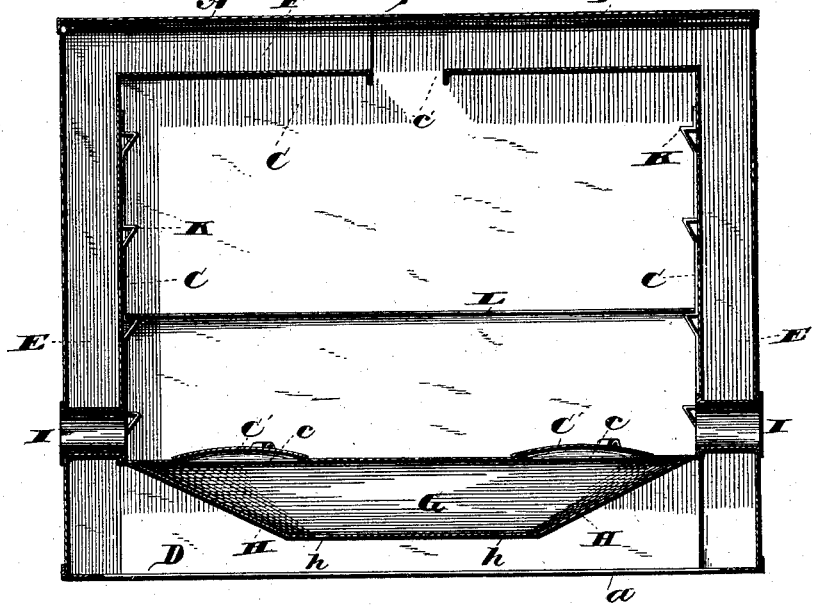
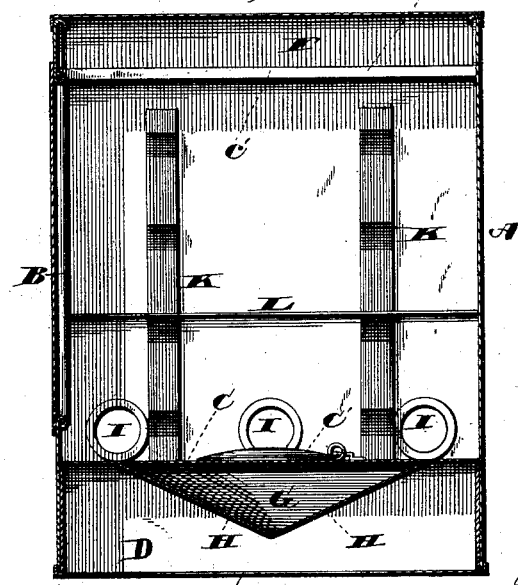
Witnesses:
Chas. J. Williamson
Henry C. Hazard
Inventor:
M. C. Root by
Prindle and Russell, his Attys

UNITED STATES PATENT OFFICE.

MILES C. ROOT, OF TOLEDO, OHIO, ASSIGNOR OF TWO-THIRDS TO RANDALL G. BACON AND ALBERT WILL, OF SAME PLACE.

PORTABLE OVEN.

SPECIFICATION forming part of Letters Patent No. 371,151, dated October 4, 1887.

Application filed July 6, 1885. Serial No. 170,825. (No model.)

*To all whom it may concern:*

Be it known that I, MILES C. ROOT, of Toledo, in the county of Lucas, and in the State of Ohio, have invented certain new and useful Improvements in Portable Ovens; and I do hereby declare that the following is a full, clear, and exact description thereof, reference being had to the accompanying drawings, in which—

Figure 1 is a perspective view of my apparatus from the front, the door being opened to show the interior construction. Fig. 2 is a vertical central section of the same upon a line passing through its longest axis, and Fig. 3 is a like view of said apparatus upon a line passing from front to rear.

Letters of like name and kind indicate like parts in each of the figures.

The design of my invention is to enable the heat of a gas or lamp stove to be utilized for the purpose of baking, roasting, &c.; and to this end said invention consists, principally, in a portable oven having the flues extending from the hot-air space below the oven-chamber up on both sides of the latter, and opening into the chamber at the middle of its top, and the outward-leading passages through the sides of the chamber near its bottom, substantially as and for the purpose hereinafter specified.

It consists, further, in a portable oven, in combination with the oven-chamber having the opening in the middle of its top, the casing, open at its lower side, inclosing the oven-chamber so as to leave spaces around its sides and over its top, and the flues leading from near the bottom of the oven-chamber out through the chamber and casing sides, substantially as and for the purpose hereinafter shown.

It consists, further, in combining with the inner chamber or oven proper, provided with an opening in its top at or near its middle point and with one or more openings or passages in its bottom, flues for receiving and conducting heated air from below the oven, extending upward and over the oven top to the opening therein, and means, substantially as described, for opening or closing the opening or openings in the oven-bottom to admit or cut off the passage of heated air from below up into the lower part of the oven, all substantially as and for the purpose set forth.

It consists, further, in combining with the inner chamber or oven proper, provided with an opening at or near the middle of its top and with one or more openings in its bottom, the casing inclosing the sides and top of the oven proper, so as to leave a space around the same open at the bottom to receive heated air from below the oven, flues passing from the lower portion of the oven outward through the casing, a deflector below the oven-bottom provided with one or more small openings, and lids or covers for closing and opening the openings in the oven-bottom, substantially as and for the purpose hereinafter shown and described.

It consists, finally, in the construction and combination of parts, substantially as and for the purpose hereinafter shown and described.

In the annexed drawings, A represents the exterior shell of my oven, which has a general rectangular form and such dimensions as will adapt it to the stove to which it is to be applied. One side of said casing is provided with a door, B, through which access may be had to its interior.

Within the casing A is a second smaller casing, C, between the bottom, ends, and top of which and the corresponding parts of said outer casing are left spaces D, E, and F, respectively, that communicate with each other, and through an opening, a, at the bottom of said casing A with the open air beneath the oven.

The space or flue D has a considerable depth, and within the same is a chamber, G, which is formed by a double-inclined plate, H, that is secured at its edges to or upon the lower face of the bottom of the inner casing, C, said chamber G being between the latter and the concave upper face of the former. Within the central portion of said deflecting-plate are provided two or more openings, $h$, and within the bottom of said casing C are two or more larger openings, $c$, that are inclosed from above, when desired, by pivoted or hinged covers C'.

At the upper side and longitudinal center of the inner casing, C, is an opening, $c'$, through which communication is afforded between the flue F and the interior of the oven, while at or near the bottom of said interior, at each end, are two or more flues, I, that extend between the same and the outer air, passing through the end flues, E.

Suitable ledges, K, being provided for the support at different elevations of a grating, L, the apparatus is complete, and is used in the ordinary manner by being placed over the flame of a gas or lamp stove. Heated air will enter the space or flue D, and, striking against the convex surface of the plate H, is deflected equally in all directions horizontally. From said flue D the heated air ascends the end flues, E, and enters the top flue, F, from which it passes through the opening $c'$ into the upper portion of the interior of the oven, where, after losing therein a portion of its heat, it reaches the lower portion of said oven, and escapes therefrom through the flues I.

For baking purposes the operation described is effective and as rapid as is expedient, and as heat is evenly distributed through the interior of the oven each portion of the article being operated upon will receive its proper share; but for roasting purposes it may be necessary that the lower part of the oven be heated to a higher point than would be practicable by the arrangement shown, in which event by partly or entirely opening the covers C' hot air in any desired quantity will pass directly into said oven.

Having thus fully set forth the nature and merits of my invention, what I claim is—

1. A portable oven having the flues extending from the hot-air space below the oven-chamber up on both sides of the latter, and opening into the chamber at the middle of its top, and the outward-leading passages through the sides of the chamber near its bottom, substantially as and for the purpose specified.

2. In a portable oven, in combination with the oven-chamber having the opening in the middle of its top, the casing, open at its lower side, inclosing the oven-chamber so as to leave spaces around its sides and over its top, and the flues leading from near the bottom of the oven-chamber out through the chamber and casing sides, substantially as and for the purpose shown.

3. In combination with the inner chamber or oven proper provided with an opening at the middle of its top and with one or more openings in its bottom, flues or passages extending from the hot-air space below the chamber up on opposite sides of the chamber and to the opening in its top, and suitable movable covers for opening and closing the openings in the oven-bottom, substantially as and for the purpose set forth.

4. In combination with the inner chamber or oven proper provided with an opening at or near the middle of its top and with one or more openings in its bottom, the casing inclosing the sides and top of the oven proper, so as to leave a space around the same open at the bottom to receive heated air from below the oven, flues passing from the lower portion of the oven outward through the casing, a deflector below the oven-bottom, provided with one or more small openings, and lids or covers for closing and opening the openings in the oven-bottom, substantially as and for the purpose shown and described.

5. The oven composed of the outer casing, A, provided with the bottom opening, $a$, and side door, B, the inner casing, C, having the openings $c$ and $c'$ and covers C', the deflecting-plate H, provided with the openings $h$, the flues D, E, F, and I, and the chamber G, all constructed and combined to operate substantially as and for the purpose shown and described.

In testimony that I claim the foregoing I have hereunto set my hand this 29th day of June, A. D. 1885.

MILES C. ROOT.

Witnesses:
I. E. KINSLEY,
FRANK HILLENKAMP.